United States Patent [19]

Sugiyama et al.

[11] Patent Number: 5,218,436
[45] Date of Patent: Jun. 8, 1993

[54] PROCESSING CIRCUIT FOR A PLURALITY OF DIFFERENT TV SIGNALS

[75] Inventors: Masato Sugiyama; Shigeru Hirahata, both of Yokohama; Tohru Suzaki, Chigasaki; Isao Nakagawa; Kenji Katsumata, both of Yokohama, all of Japan

[73] Assignee: Hitachi, Ltd., Tokyo, Japan

[21] Appl. No.: 644,888

[22] Filed: Jan. 23, 1991

[30] Foreign Application Priority Data

Jan. 24, 1990 [JP] Japan .................. 2-012726

[51] Int. Cl.⁵ .................. H04N 5/46; H04N 7/04
[52] U.S. Cl. .................. 358/141; 358/230; 358/140; 358/11
[58] Field of Search .................. 358/140, 141, 11, 12, 358/31, 230

[56] References Cited

U.S. PATENT DOCUMENTS

| | | | |
|---|---|---|---|
| 4,605,952 | 8/1986 | Powers | 358/12 |
| 4,622,577 | 11/1986 | Reitmeier et al. | 358/11 |
| 4,631,574 | 12/1986 | LoCicero et al. | 358/12 |
| 4,733,297 | 3/1988 | Katsumata et al. | 358/105 |
| 4,733,300 | 3/1988 | Sugiyama et al. | 358/140 |
| 4,794,454 | 12/1988 | Sugiyama et al. | 358/105 |
| 4,800,426 | 1/1989 | Glenn | 358/12 |
| 4,860,090 | 8/1989 | Murata et al. | 358/11 |
| 4,870,481 | 9/1989 | Kawamata | 358/12 |
| 4,882,625 | 11/1989 | Akiyama | 358/140 |
| 4,931,855 | 6/1990 | Salvadorini | 358/12 |
| 5,025,309 | 6/1991 | Isnardi | 358/12 |
| 5,029,007 | 7/1991 | Spiero | 358/11 |
| 5,034,814 | 7/1991 | Watson | 358/141 |
| 5,055,915 | 10/1991 | Tsinberg | 358/12 |

FOREIGN PATENT DOCUMENTS

| | | |
|---|---|---|
| 0144693 | 8/1984 | European Pat. Off. . |
| 0165833 | 8/1985 | Japan . |
| 0146672 | 6/1988 | Japan . |
| 0232771 | 9/1988 | Japan . |
| 0221068 | 9/1989 | Japan . |
| 0105689 | 4/1990 | Japan . |
| 0302188 | 12/1990 | Japan . |
| 8605644 | 9/1986 | PCT Int'l Appl. . |

OTHER PUBLICATIONS

"HDTV Update", Radio Electronics, Brian C. Fenton, pp. 4, 16, 17, 66, Jan., 1988.

Yuichi Ninomiya, et al., "Development for the Muse System", NHK Technical Study Report, vol. 39, No. 2, Ser. No. 172, 1987, pp. 18-53. (Provided in Japanese).

Primary Examiner—James J. Groody
Assistant Examiner—Jeffrey S. Murrell
Attorney, Agent, or Firm—Fay, Sharpe, Beall, Fagan, Minnich & McKee

[57] ABSTRACT

A television for receiving two or more types of television signals capable of displaying an image irrespective of the types of a received television signal and a display for displaying an image, by controlling, in accordance with the receiving television signal and the display, a processor and aspect ratio converter for demodulating the received television signal.

17 Claims, 17 Drawing Sheets

F I G. 3
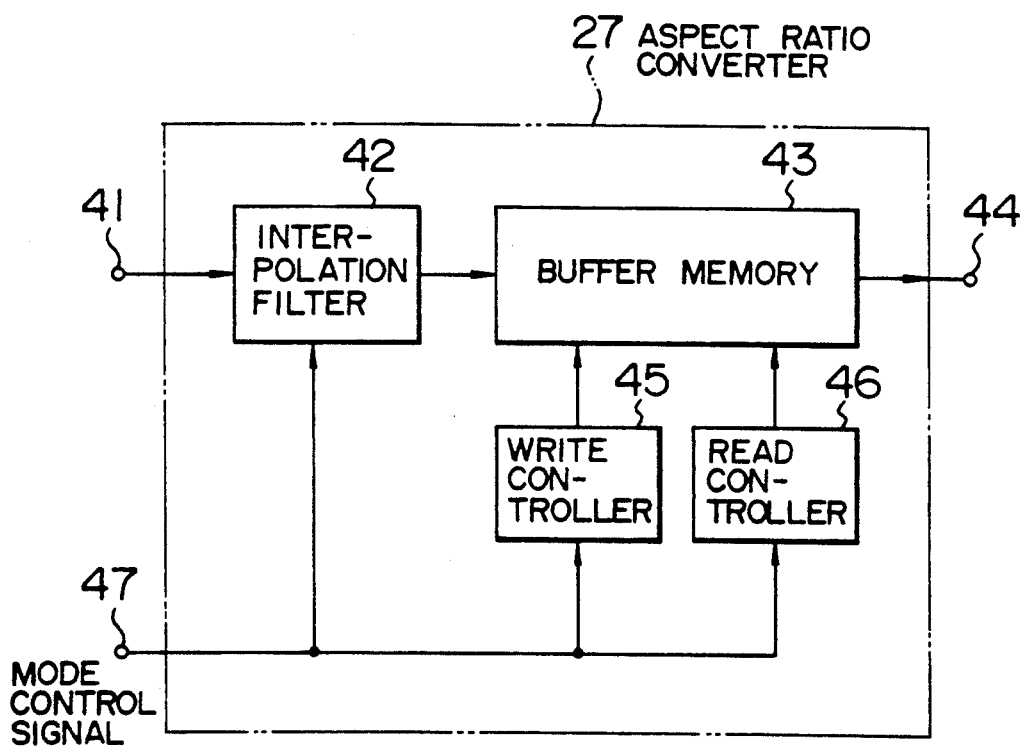

(a)
(b)
(c)

(a)
(b)

F I G. 12A
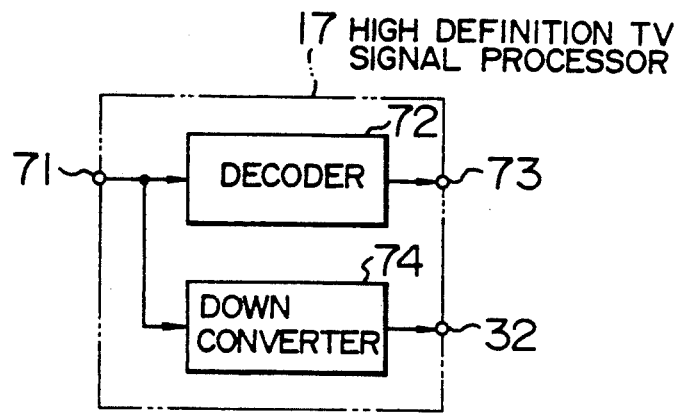
F I G. 12B
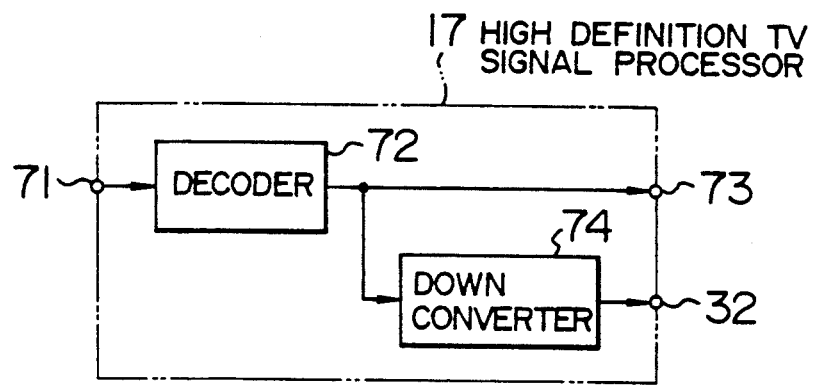
F I G. 12C
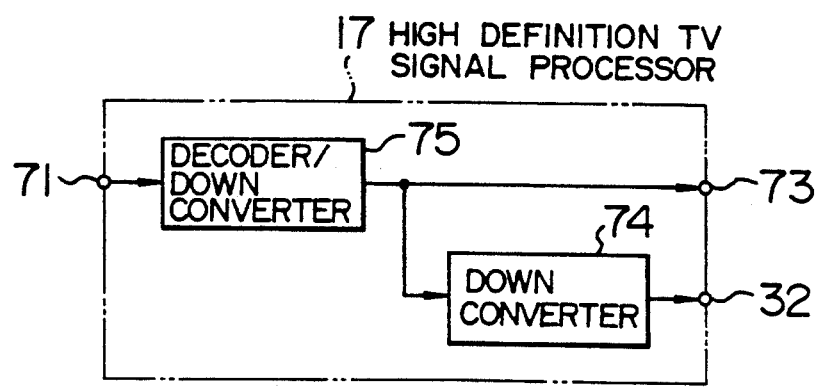

FIG. 15
FIG. 16
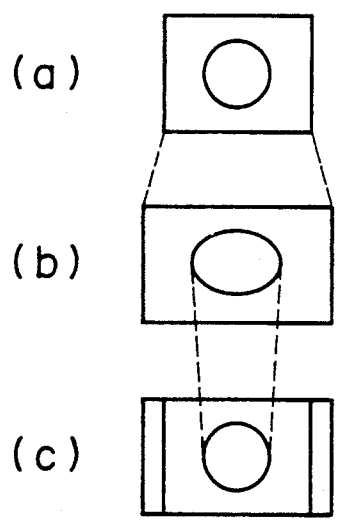
(a)
(b)
(c)
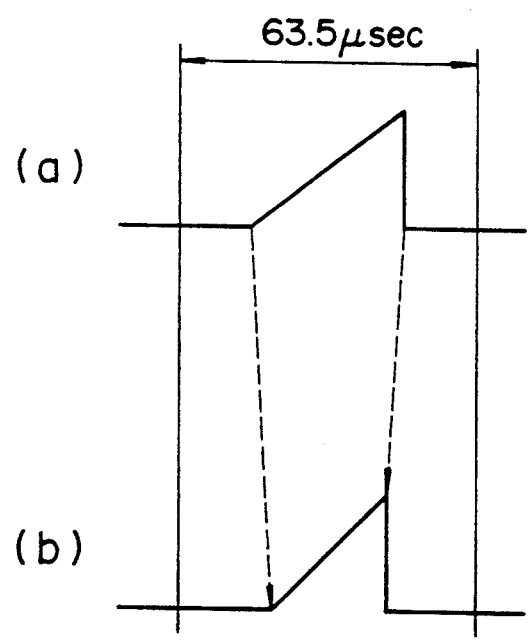
63.5 μsec
(a)
(b)

PROCESSING CIRCUIT FOR A PLURALITY OF DIFFERENT TV SIGNALS

BACKGROUND OF THE INVENTION

The present invention relates to a circuit for and method of processing a television signal. More particularly, the present invention relates to a circuit for and method of processing an inputted television signal and outputting a video signal having an aspect ratio and image quality suitable for a connected television display, irrespective of the type of the inputted television signal such as a high definition television signal and a presently used standard television signal, and the type of the display such as a display with a wide aspect ratio and a display with a presently used standard aspect ratio.

An NTSC system is presently used as a standard color television system. In Japan and other foreign countries, as a new television system a High Definition TV (HDTV) is now being studied. In Japan, for exmaple, there is known a high vision system which is now being developed mainly by Nippon Hoso Kyokai NHK.

One of the characteristic features of the high vision system resides in that the number of scan lines is 1125 and the signal bandwidth is 20 MHz or wider which has information quantity about five times as large as the present NTSC system, realizing a very fine image (see NHK Technical Study Report, 1987, Vol. 39, No. 2, Serial No. 172, pp. 18 to 53).

Another of the characteristic features of the high vision system is that the aspect ratio of a screen is 9:16 having a horizontal side longer than the aspect ratio 3:4 of the NTSC system. Therefore, in order to display a high vision signal on a television display of the NTSC system, it is necessary to provide a signal converter called a down converter for adjusting the aspect ratio.

As the television system having such a wide aspect ratio (9:16), there is an Enhanced TV (EDTV) system of second generation also being studied in Japan (hereinafter abbreviated as EDTV-II).

The EDTV-II system intends to obtain a wide and fine image while ensuring compatibility with the presently used NTSC system.

The high vision system and EDTV-II system having a wide aspect ratio are expected to come into practical use at substantially the same time in near future, while continuing to use the presently used NTSC system. Therefore, if broadcast signals of various systems are all to be received, several television receivers are required to be newly bought and installed, which is not practical from the viewpoint of expenses and spaces.

It is an object of the present invention to provide a television signal processing circuit and method capable of receiving television signals of different systems with a single television receiver by discriminating the inputting television signals and selecting a proper signal processing circuit, irrespective of the type of an inputted television signal such as a high definition television signal (e.g., of the high vision system), an EDTV signal (e.g., of the EDTV-II system), and a presently used standard television signal (e.g., of the NTSC system).

More particularly, according to a first aspect of this invention, there is provided a television signal processing circuit and method capable of receiving a broadcast signal for any aspect ratio of a television display, for example, an aspect ratio of 3:4 and a wide aspect ratio (e.g., 9:16).

According to a second aspect of this invention, there is provided a television signal processing circuit and method capable of receiving a broadcast signal for any scan type irrespective of whether a television display is a single scan type display dealing with only one scan type or a multi-scan type display dealing with a plurality of scan types.

According to a third aspect of this invention, there is provided a television signal processing circuit and method capable of separately outputting a luminance signal and color signals irrespective of the type of an inputted television signal.

SUMMARY OF THE INVENTION

In order to achieve the above first and second aspects, there are provided a plurality of television signal input terminals for different broadcasting systems; a display terminal to which a display for displaying a television image is connected; display type discrimination means for discriminating the type of the display; television signal discrimination means for discriminating the type of a broadcasting system of the inputted television signal; a plurality of processors for processing television signals of different broadcasting systems (e.g., an HD processor for processing a high vision signal, an ID processor for performing a high image quality process of a presently used standard television signal, and an ED processor for performing an EDTV process); at least one aspect ratio conversion means for converting an aspect ratio so as to obtain a normal aspect ratio image on the display; and mode control means for receiving a discrimination signal from the television signal discrimination means and a discrimination signal from the display type discrimination means and controlling the HD, ID, and ED processors and the aspect ratio conversion means.

In order to achieve the third aspect of the present invention, the ID processor, HD processor, or ED processor is provided with S encode means for generating a signal having the scan format in conformity with at least the present standard television signal and outputting the signal as a separated luminance signal and color signals, wide screen discrimination signal adding means for adding a discrimination signal to the signal outputted from the S encode means, the discrimination signal being representative of whether or not the signal outputted as the luminance signal and color signals from the S encode signal is a television signal having a wide aspect ratio, and wide screen discrimination signal detection means for detecting the discrimination signal representative of whether or not an inputted signal from the television signal input terminal is a television signal having a wide aspect ratio.

The mode control means receives a dicscrimination signal of a television signal discriminated by the television signal discrimination means and a display type signal outputted from the display type discrimination means, and controls the HD processor, ID processor, and ED processor, and the aspect ratio conversion means. Even if a high definition television signal, an EDTV signal, or a presently used standard television signal is inputted from the television signal input terminal, the inputted television signal can be discriminated and an optimum process for the discriminated television signal can be performed, so that any type of television signals can be received with a single television receiver.

A signal supplied to the display type discrimination nation means discriminates the type of a display connected to the display terminal, for example, discriminates between an interlace scan and a sequential scan, between a wide aspect ratio and a standard aspect, and between a high definition television signal and a standard television signal. Thus, an optimum process for a connected display is possible, so that any type of displays can be dealt with a single television receiver.

The S encode means receives a television signal having the scan format in conformity with the presently used standard television signal, from the HD, ID or ED processor, and converts the received television signal into a television signal having a separated luminance signal and color signals.

The wide screen discrimination signal adding means adds a discrimination signal to the television signal having a separated luminance signal and color signals outputted from the S encode means to indicate if the television signal has the aspect ratio same as the presently used aspect ratio or a wide aspect ratio.

The wide screen discrimination signal detection means detects the discrimination signal of the television signal inputted from the television signal input terminal and having the same scan line number and scan speed same as the presently used standard television signal, the discrimination signal discriminating whether or not the inputted television signal has a wide aspect ratio.

In the above manner, even if the television signal inputted from the television signal input terminal is a signal having the aspect ratio same as the presently used standard television system or a signal having a wide aspect ratio, the aspect ratio in concern can be correctly recognized so that it is possible to display an image having a normal vertical/horizontal ratio in accordance with the type of a display connected to the display terminal.

BRIEF DESCRIPTION OF THE DRAWINGS

FIG. 3 is a block diagram showing an example of the structure of an aspect ratio converter;

FIGS. 12A to 12C are block diagrams showing examples of the structure of the HD processor;

FIG. 15 illustrates inconveniences suffered when aspect ratio conversion is not applied;

FIG. 16 shows video signal waveforms when aspect ratio conversion is applied;

DESCRIPTION OF THE PREFERRED EMBODIMENTS

The preferred embodiments of this invention will be described with reference to the accompanying drawings.

The outline of an embodiment of this invention will be described briefly with reference to FIG. 1, and then the description will be given for other embodiments where each of the following displays is connected to the signal processing circuit described with FIG. 1:

(1) Display with Aspect Ratio 3:4
(scan line number 525/frame frequency 30 Hz);
(2) Display with Aspect Ratio 3:4
(scan line number 525/frame frequency 60 Hz);
(3) Display with Aspect Ratio 3:4
(scan line number 525/frame frequency 60 Hz, scan line number 1125/frame frequency 30 Hz);
(4) Display with Aspect Ratio 9:16
(Scan line number 525/frame frequency 30 Hz)
(5) Display with Aspect Ratio 9:16
(scan line number 525/frame frequency 60 Hz); and,
(6) Display with Aspect Ratio 9:16
(scan line number 525/frame frequency 60 Hz, scan line number 1125/frame frequency 30 Hz).

The following description will be given by grouping it into four categories including (a), (b), (c) where three types of television signals are processed, respectively, and (d) where a television signal is processed and outputted to another video equipment (such as VCR), as in the following:

(a) an NTSC signal of the presently used system;
(b) an EDTV-II signal as an EDTV signal;
(c) a MUSE signal as a high definition television signal; and
(d) an output signal to another video equipment.

Figure 1:
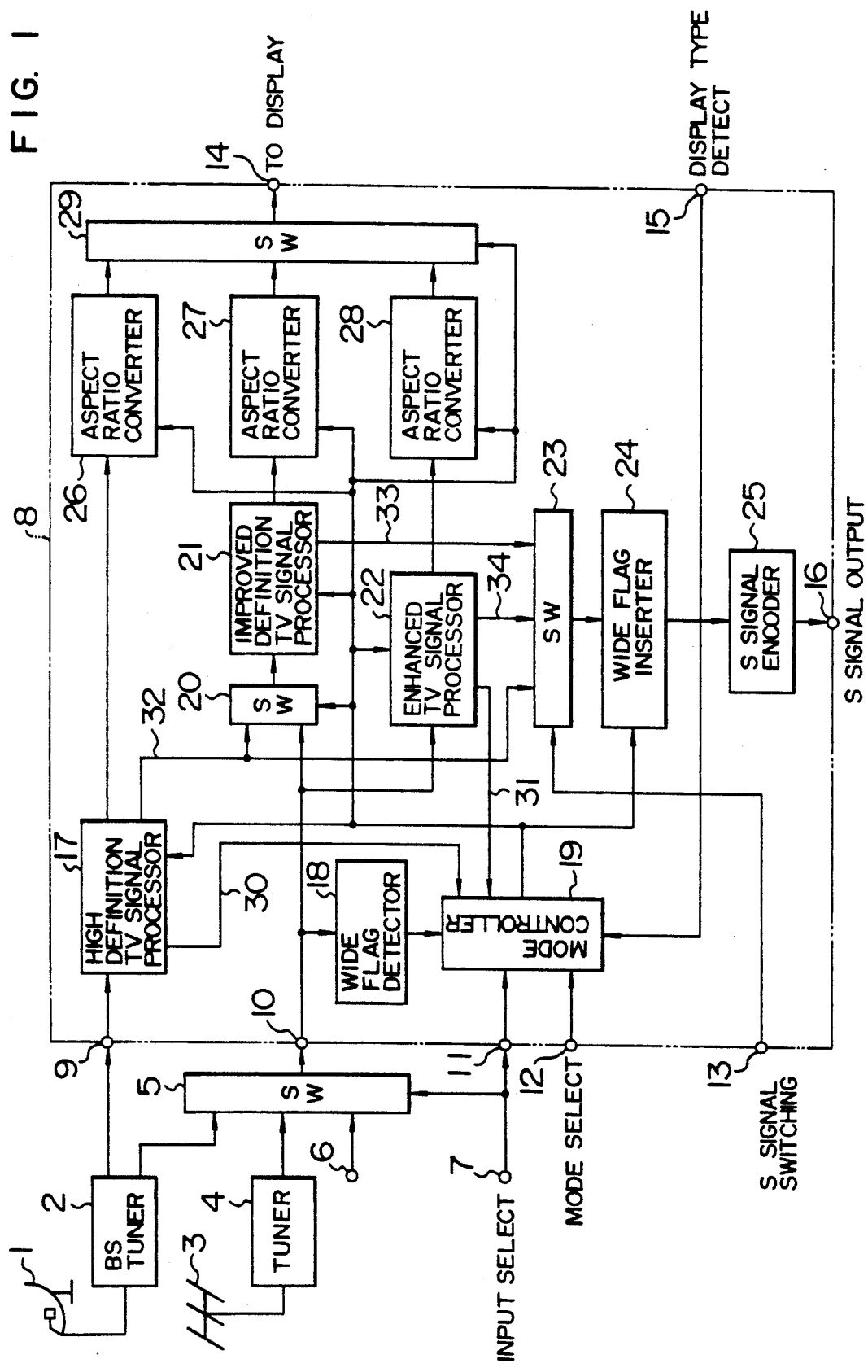
FIG. 1 is a block diagram showing an embodiment of this invention.

Referring now to FIG. 1, reference numeral 1 represents a broadcast satellite (BS) antenna; 2 a BS tuner; 3, an antenna; 4 a TV tuner; 5, 20, 23, and 29 switches; 6, 9, and 10 video input terminals; 7 an input select signal; 8 a television signal processing circuit; 11 an input terminal for an input select signal; 12 an input terminal for a mode select signal; 13 an input terminal for switching a separate (hereinafter abbreviated as S) signal; 14 an output terminal to a display; 15 an input terminal for a display type discrimination signal; 16 an S output terminal; 17 an HD processor; 18 a wide screen discrimination signal detector or wide flag detector; 19 a mode controller; 21 an ID processor; 22 an ED processor; 24 a wide screen discrimination signal adder or wide flag inserter; 25 an S encoder; 26, 27, and 28 aspect ratio converters; 30 a MUSE discrimination signal; 31 an ED flag detect signal; and 32, 33, and 34 signals for an S output in conformity with the presently used standard television signal.

A MUSE signal outputted from the BS tuner 2 is supplied to the HD processor 17 via the video input terminal 9 of the television signal processing circuit 8. The HD processor 17 is constructed of a MUSE decoder and a down converter, an output from the HD converter 17 being sent to the first aspect ratio converter 26 and second switch 20. The HD processor discriminates if the supplied signal is a MUSE signal or not. The judgment result is sent as a MUSE discrimination signal 30 to the mode controller 19. The aspect ratio converter 26 operates, when a display having an aspect ratio 3:4 is connected to the display terminal 14, to convert a wide aspect signal so as to be displayed as a normal vertical/horizontal ratio image on the display having the aspect ratio 3:4.

An NTSC signal outputted from the BS tuner 2, a signal ouputted from the TV tuner 4, or a television signal inputted from the video input terminal 6 (such as for VCR and VDP) in conformity with the NTSC system is selected by the first switch and supplied to the video input terminal 10 of the television signal processing circuit 8. The wide flag detector 18 detects a wide flag or discrimination signal which discriminates whether an inputted television signal is a signal having the wide aspect ratio, and sends the discrimination result to the mode controller 19.

The second switch 20 selects either a television signal from the HD processor 17 in conformity with the scan scheme of the NTSC system or a television signal from the video input terminal 10, and supplies it to the ID processor. The ID processor 21 performs an improved image quality process or improved definition television IDTV process such as separation between a luminance signal and color signals by through inter-frame processing, noise reduction, and scan line interpolation. As example of a particular structure of the ID process is described for example in U.S. Pat. No. 4,860,090.

The second aspect ratio converter 27 operates, when a wide aspect signal or standard aspect signal outputted from the ID processor 21 is to be displayed on a display having an aspect ratio 3:4 or on a display having a wide aspect ratio, respectively, to convert the received signal so as to be displayed as a normal vertical/horizontal ratio image on the display.

The EDTV processor 22 performs the EDTV process such as making a fine image, wide image and the like. The ED processor also discriminates if a supplied signal is an EDTV signal or not, the discrimination result being sent as the ED flag detect signal 31 to the mode controller 19. Similar to the first aspect ratio converter 26, the third aspect ratio converter operates, when a display having an aspect ratio 3:4 is connected to the display terminal 14, to convert a wide aspect signal so as to be displayed as a normal horizontal/vertical ratio image on the display having the aspect ratio 3:4.

The mode controller 19 receives the input select signal 11, mode discrimination signal 12, and display type select signal 15 from the input terminals, and also receives the signal from the wide flag detector 18, MUSE discrimination signal 30, and ED flag detection signal 31. In accordance with these inputted signals, the mode controller 19 controls each circuit portion of the television signal processing circuit 8.

The third switch 23 selects one of the television signals 32, 33, and 34. The television signal 32 is a signal which was down converted to the scan scheme of the NTSC system and outputted from the HD processor 17. The television signal 33 is a signal which was subjected to the IDTV process at the standard speed not including sequential scan conversion and outputted from the ID processor 21. The television signal 34 is a signal which was subjected to the EDTV process at the standard speed not including sequential scan conversion. The wide flag inserter 24 adds to the selected television signal a flag which indicates whether or not the television signal selected and outputted from the third switch 23 is a wide aspect signal. This flag may be realized by multiplexing or superposing particular patterned signals upon the television signal during the vertical blanking period.

The S encoder 25 outputs an S signal by way of the S output terminal 16, the S signal being properly formatted for example by modulating the color sub-carrier frequency by the color difference signal.

The fourth switch 29 selects one of the output signals from the first to third aspect ratio converters 26, 27, and 28 to output it to the display via the display terminal 14.

Next, the operation of each circuit element of the embodiment shown in FIG. 1 will be described with reference to the accompanying drawings, for the cases where different types of displays are connected to the display terminal 14.

(1) 3:4 Display (525/30)

First, there will be described the case where an image is displayed on a display having an aspect ratio (3:4) which is interlace-scanned with scan lines 525 and frame frequency 30 Hz. This embodiment is shown in block form in FIG. 2.

(1 - a) Input of Presently used NTSC System signal

Figure 2:
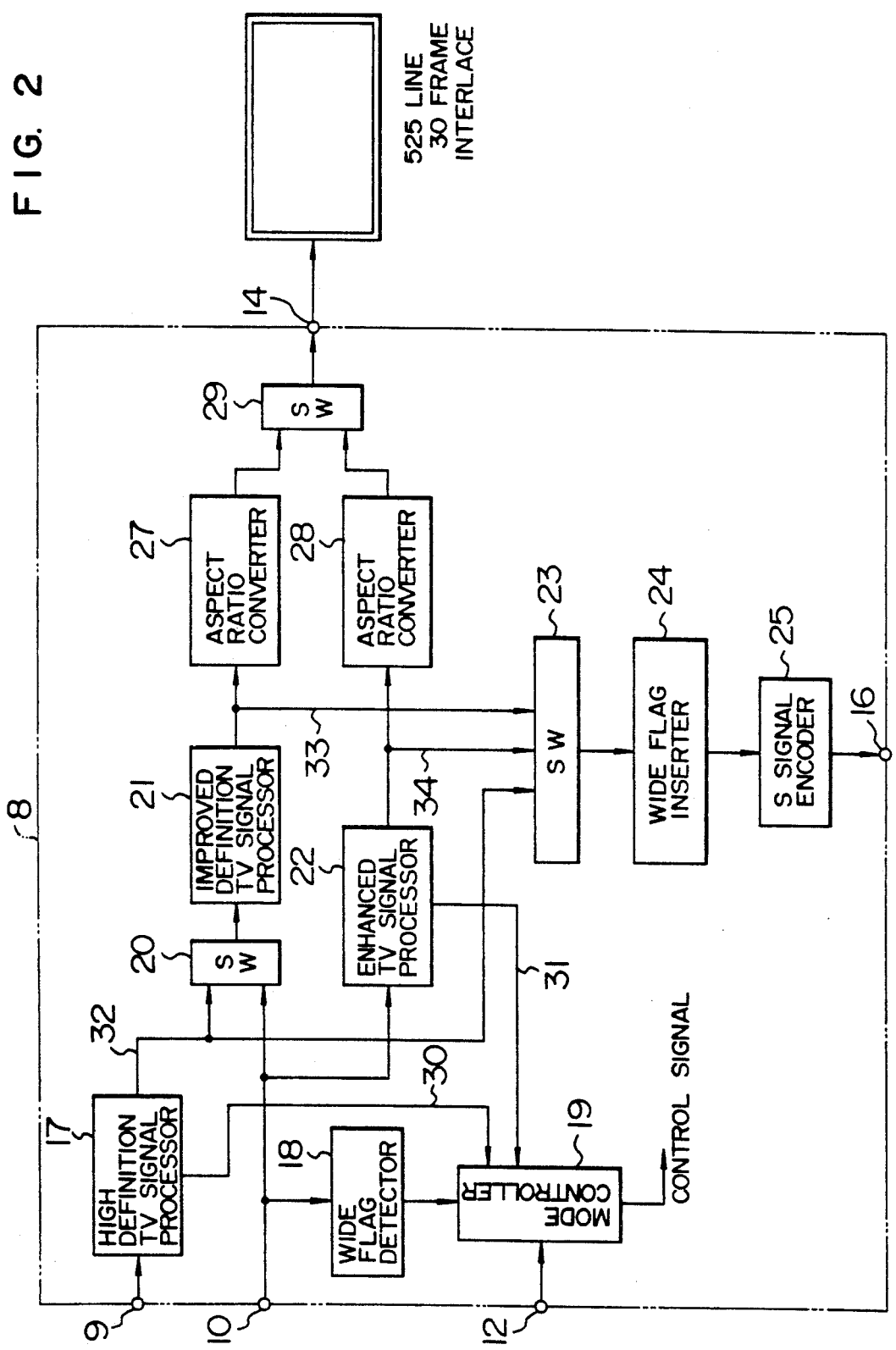
FIG. 2 is a block diagram showing a modification of the embodiment shown in FIG. 1.

Referring to FIG. 2, the second switch 20 selects a television signal inputted to the video input terminal 10. The ID processor 21 performs the IDTV process at the standard speed without sequential scan conversion, i.e., performs a high image quality process such as YC separation by inter-frame processes and noise reducing, and thereafter outputs the signal to the display terminal 14 via the second aspect ratio converter 27.

The second aspect ratio converter 27 converts the television signal inputted from the video input terminal 10, if it is the wide aspect signal, so as to make it have a normal vertical/horizontal ratio image on the display having the standard aspect ratio. As this conversion method, it can be considered to use a method of expanding the center portion of an image to the right and left, or a method of compressing an image vertically. Such a method is selected by the mode select signal 12. If the television signal inputted from the video input terminal is other than the wide aspect signal, the second aspect ratio converter 27 is controlled to stop operating.

Whether the input signal is the wide aspect signal or not is detected by the wide flag detector 18.

The second aspect ratio converter 27 can be realized as having the structure shown in FIG. 3 which will be described briefly in the following.

In FIG. 3, reference numeral 41 represents an input signal from the ID processor, 42 a two-dimensional interpolation filter, 43 a buffer memory, 44 an output signal to the fourth switch 29, 45 a write controller, 46 a read controller, and 47 a mode control or select signal.

Figure 4:
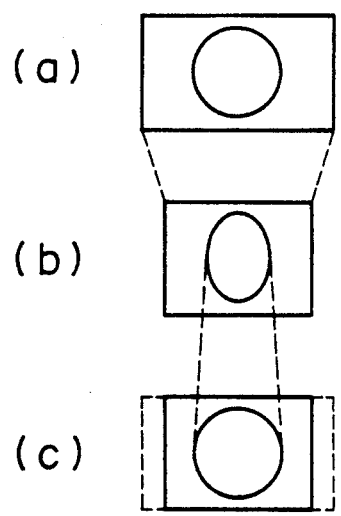
FIG. 4 illustrates inconveniences suffered when aspect ratio conversion is not applied.
Figure 5:
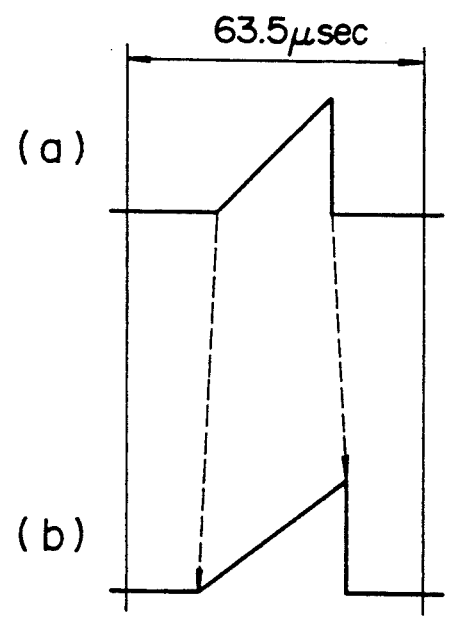
FIG. 5 shows video signal waveforms when aspect ratio conversion is applied.

First, the right/left expansion method will be described. For example, in order to avoid the wide aspect image shown in FIG. 4A to be displayed on the display having the standard aspect ratio 3:4 as an image which is laterally compressed as shown in FIG. 4B, the video signal to be displayed is expanded by 4/3-fold in the direction with respect to time. In this case, the read speed of the buffer memory 43 is made about ¾ times as slow as the write speed, so that about ¾ area of the wide image can be displayed on the whole area of the standard display screen.

Figure 6:
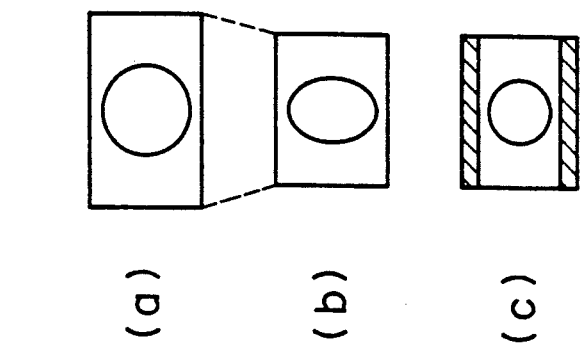
FIG. 6 illustrates inconveniences suffered when aspect ratio conversion is not applied.

Next, the upper/lower compression method will be described. In this case, the vertical side of the image is compressed by about ¾-fold to have a normal vertical/horizontal ratio as shown in FIG. 6C. To this end, for example, three scan lines are formed from four original scan lines by a filtering process, and the converted scan lines are displayed.

Figure 7:
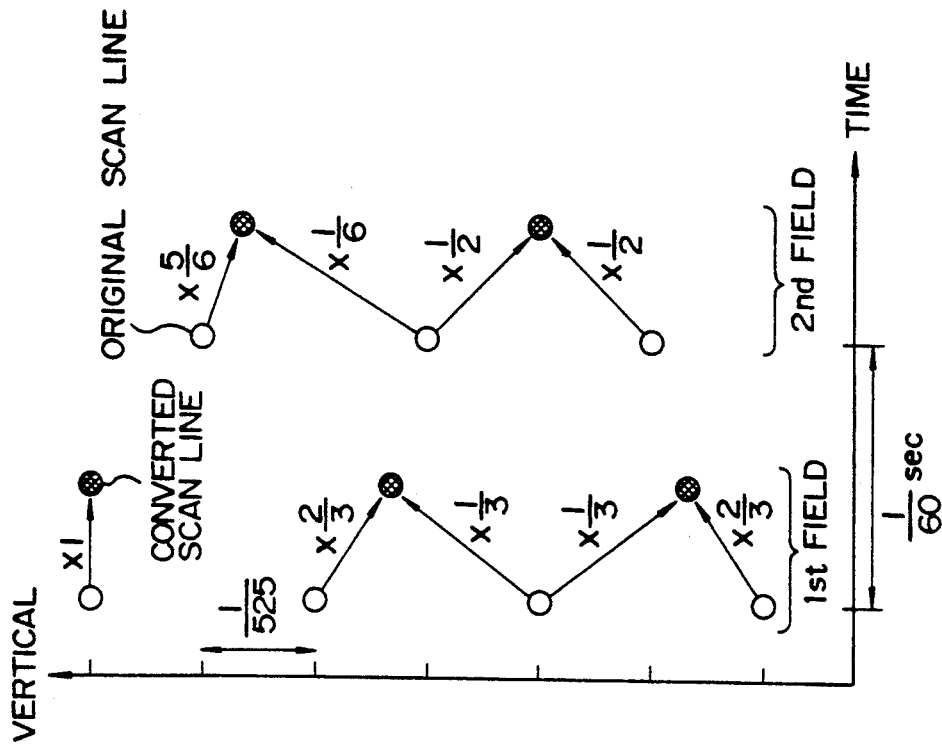
FIG. 7 illustrates the scan line arrangement when aspect ratio conversion is applied.

In FIG. 7, a circle represents an original scan line, a solid circle represents a converted scan line, and a combination of an arrow and associated numerical value represents a mixture ratio at which converted scan lines are formed from original scan lines.

It is to be noted that FIG. 7 shows a scan line arrangement as viewed from the cross section of a scan line, the abscissa represents time, and the ordinate represents the vertical direction of the image or screen.

It becomes possible to obtain an image shown in FIG. 6C by writing converted scan lines shown in FIG. 7 in the buffer memory 43 and sequentially reading them.

(1 - b) Input of EDTV-II Signal

As shown in FIG. 2, an EDTV-II signal is supplied to the ED processor 22 which performs the EDTV process at the standard speed without sequential scan conversion, i.e., performs a wide and fine image process. The ED flag detect signal 31 detected by the ED processor 22 is supplied to the mode controller 19. The ED flag may be realized, for example, by superposing specific patterned signals upon a television signal during the vertical blanking period.

The third aspect ratio converter 28 receives the wide aspect signal from the ED processor 22, and converts it so as to make it have a normal vertical/horizontal ratio image on the display having the aspect ratio 3:4. The third aspect ratio converter 28 may be constructed to have the same structure as the second aspect ratio converter 27.

(1 - c) Input of MUSE Signal

Next the operation when a MUSE signal is inputted will be described.

Referring to FIG. 2, the HD processor 17 receives a MUSE signal from the BS tuner 2 via the video input terminal 9, and performs a down conversion process for reducing 1125 scan lines to 525 scan lines. This down conversion process may be the same as conventional. The signal 32 having the same scan format as the NTSC system as a result of the down conversion process by the HD processor is supplied to the ID processor to perform the IDTV process at the standard speed to obtain a high quality image.

The signal from the HD processor 17 is separated into a luminance signal and color signals which are then supplied to the ID processor 21. Since the MUSE signal originally contains the luminance signal and color signals which are transmitted in time multiplex, the IDTV process does not require the YC separation and the main operation thereof is as a noise reducer.

The second aspect ratio converter 27 converts the wide aspect signal so as to make it have a normal vertical/horizontal ratio image on the display having the aspect ratio 3:4, similar to the case described with the (1 - a) section.

(1 - d) Signal to Other Video Apparatus

Next, the operation when a signal is outputted to another video apparatus (such as VCR) will be described.

Referring to FIG. 2, signals outputted from the ID processor 21, ED processor 22, HD processor 17 are supplied to the third switch 23 which in turn selects one of them. As described previously, these signals supplied to the third switch 23 has scan lines and scan speed same as the NTSC system.

The wide flag inserter 24 adds to the signal outputted from the third switch 23 a discriminator or flag which indicates if the signal selected by the third switch 23 is a wide aspect signal. The S encoder 25 outputs an S signal from the S output terminal 16, the S signal being properly formatted for example by modulating the color sub-carrier frequency by the color difference signal.

The S signal generated in the above manner is supplied to another video apparatus where the S signal is used for various applications.

For example, it is possible to record images in a VTR having an S terminal. In order to display the reproduced signals from the VCR, the reproduced signals are supplied to the video input terminal 6 described with FIG. 1 and thereafter processed.

Referring back to FIG. 2, the wide flag detector 18 detects a wide flag or discrimination signal indicating whether or not the S input signal is a wide aspect signal, the discrimination result being sent to the mode controller 19. In this manner, the operation of the second aspect ratio converter 27 can be adaptively controlled depending upon whether or not the S input signal is a wide aspect signal, to thereby prevent a different vertical/horizontal ratio image from being displayed.

As described above, with the above arrangement, a MUSE signal or EDTV-II signal can be displayed on a 525/30 display having the aspect ratio 3:4. Furthermore, the signal obtained from a MUSE signal through down conversion is also subjected to the IDTV process at the standard speed so that a low S/N ratio usually caused by a down converter can be alleviated.

(2) 3:4 Display (525/60)

Next, there will be described the case where an image is displayed on a display having an aspect ratio (3:4) which is non-interlace-scanned with scan lines 525 and frame frequency 60 Hz. This embodiment is shown in block form in FIG. 8.

(2 - a) Input of Presently used NTSC System Signal

Figure 8:
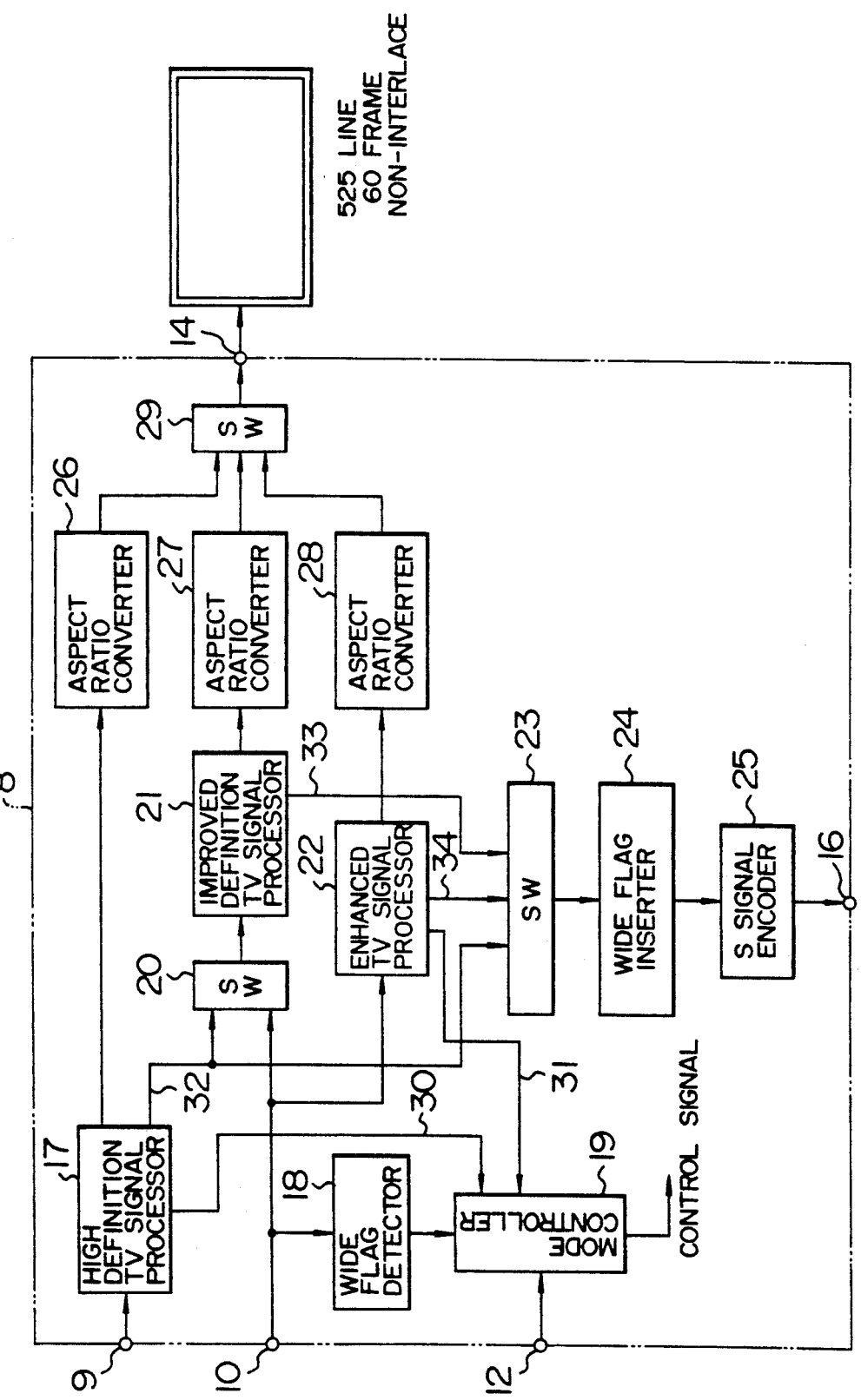
FIG. 8 is a block diagram showing another modification of the embodiment shown in FIG. 1.

The operations of this section (2 - a) are substantially the same as that described in the section (1 - a) except that the ID processor 21 shown in FIG. 8 performs the IDTV process with sequential scan conversion.

The ID processor 21 supplies a non-interlace-scanned signal obtained through sequential scan conversion to the display terminal 14 via the second aspect ratio converter 27, and also supplies a signal 33 subjected to the IDTV process at the standard speed to the S output terminal 16 via the third switch 23.

It is therefore possible to display a high quality image on a non-interlace display without line flickers. Furthermore, a signal having the scan format same as the presently used system can be outputted to the S output terminal 16 thereby allowing a connection to a presently available VCR.

Figure 9:
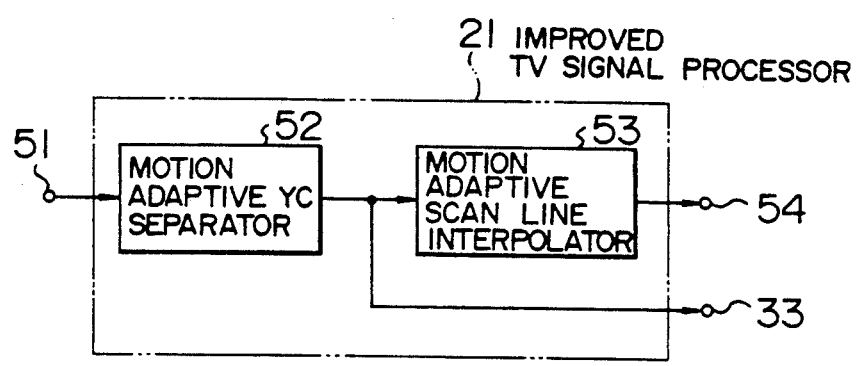
FIG. 9 is a block diagram showing an example of the structure of the ID processor.

An example of the structure of the ID processor 21 is shown in FIG. 9. In FIG. 9, reference numeral 51 represents an input signal from the second switch 20, 52 a motion adaptive YC separator, 53 a motion adaptive scan line interpolator, 54 an output signal to the second aspect ratio converter, and 33 an output signal to the third switch 23.

The input signal 51 from the second switch 20 is supplied to the motion adaptive YC separator 52 and subjected to the YC separation using inter-frame correlation and the noise reducing process. Thereafter, at the motion adaptive scan line interpolator 53, the signal is subjected to a sequential scan conversion process using inter-field correlation and outputted to the second aspect ratio converter 27.

In the operations described with the (1 - a) section, the second aspect ratio converter 27 is not supplied with the output signal 54, but supplied with the output signal 33 from the motion adaptive YC separator 52. Instead, it may be well adopted to supply output signal 54 to the converter 27 by controlling to stop the operation of the interpolator 13.

(2 - b) Input of EDTV-II Signal

The operations of this section (2 - b) when an EDTV-II signal is inputted are substantially the same as that described in the section (1 - b) except that the ED processor 22 shown in FIG. 8 performs the EDTV process with sequential scan conversion.

The ED processor 22 supplies a non-interlace-scanned signal obtained through sequential scan conversion to the display terminal 14 via the third aspect ratio converter 28, and also supplies a signal 33 subjected only to the EDTV process at the standard speed to the S output terminal 16 via the third switch 23. It is therefore possible to display a high quality image on a non-interlace display without line flickers. Furthermore, a signal having the scan format same as the presently used system can be outputted to the S output terminal 16 thereby allowing a connection to a presently available VCR.

Figure 10:
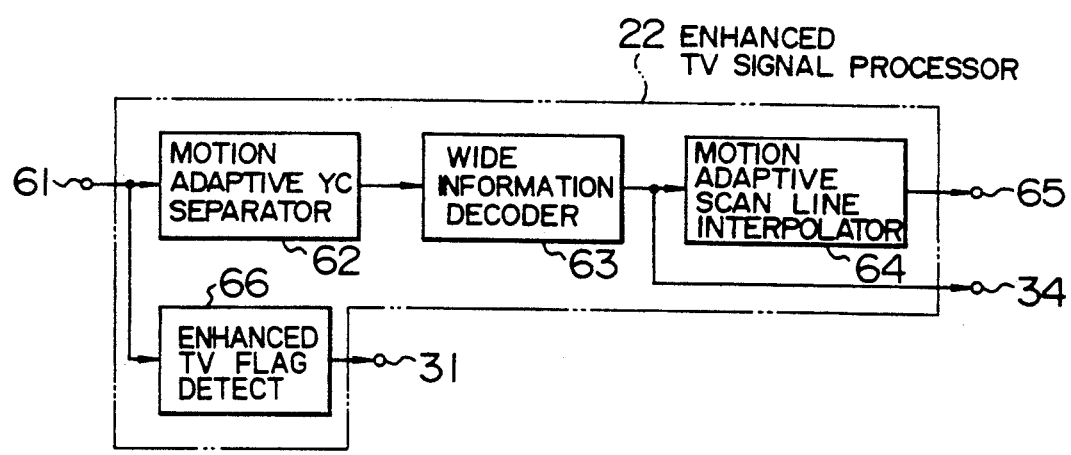
FIG. 10 is a block diagram showing an example of the structure of the ED processor.

An example of the structure of the ED processor 22 is shown in FIG. 10.

In FIG. 10, reference numeral 61 represents an input signal from the video input terminal, 62 a motion adaptive YC separator, 63 a wide information decoder, 64 a motion adaptive scan line interpolator, 65 an output signal to the third aspect ratio converter, 66 an ED flag detector, 31 an ED flag detect signal, and 34 an output signal to the third switch 23.

The input signal 61 from the video input terminal 10 is supplied to the motion adaptive YC separator 62 and subjected to the YC separation using inter-frame correlation and the noise reducing process. Thereafter, the wide information decoder 63 performs a wide image process. Next, at the motion adaptive scan line interpolator 64, the signal is subjected to a sequential scan conversion process using inter-field correlation and outputted as an output signal 65 to the third aspect ratio convertr 28.

It is necessary for the S output signal to be a signal processed at the standard speed without sequential scan conversion. Such a signal is selected as the output signal from the wide information decoder 63. The ED flag detector 66 detects an ED flag indicating whether or not the input signal 61 from the video input terminal 10 is an EDTV-II signal. If it is an EDTV-II signal, the ED flag detect signal 31 is outputted to the mode controller 19.

(2 - c) Input of MUSE Signal

It can be considered the following two methods of converting a MUSE signal into a signal for (scan lines 525/frame frequency 60 Hz):

(i) a method wherein the MUSE signal is once converted into a signal for (scan lines 525/frame frequency 30 Hz), and thereafter the IDTV process is executed, and (ii) a method wherein the MUSE signal is directly converted into a signal for (scan lines 525/frame frequency 60 Hz).

This embodiment is constructed to deal with both the methods and one of them is selected for image displaying.

The advantages of the method (1) reside in that the effect and function of the S/N ratio improved by the ID processor 21 shown in FIG. 8 can be expected and that the converted signal for (scan lines 525/frame frequency 30 Hz) can be used for the S signal output. In this case, the HD processor 17 shown in FIG. 8 performs the same process as described with the section (1 - c). The ID processor 21 performs the IDTV process including sequential scan similar to the section (2 - a). The second aspect ratio converter 27 converts the wide aspect ratio signal from the ID processor 21 so as to make it have a normal vertical/horizontal ratio image on a display having an aspect ratio 3:4.

With the second method (ii) of directly converting a MUSE signal into a signal for (scan lines 525/frame frequency 60 Hz), the HD processor 17 shown in FIG. 8 generates signals to be supplied to both the display terminal 14 and the S signal output terminal 16 so that two interpolation filters for scan line number conversion are required.

However, since the amount of thinning scan line information can be made small, there is the advantage that the improved vertical resolution of a moving image can be obtained.

A signal for (scan lines 525/frame frequency 60 Hz) outputted from the HD processor 17 is supplied to the first aspect ratio converter 26, and converted to make it have a normal vertical/horizontal ratio image on a display having a standard aspect ratio, the converted signal being outputted to the display terminal 14.

(2 - d) Signal to Other video Apparatus

In the section (1 - d) described above, the ID processor 21, ED processor 22, and HD processor 17 supply, a signal of the same type as that supplied to the display terminal 14, to the third switch 23. However, in this case, a signal for (scan lines 525/frame frequency 30 Hz) is required to be supplied for the S output signal. For this reason, in this circuit arrangement, the ID processor 21, ED processor 22, and HD processor 17 respectively shown in FIG. 8 supply a signal for (scan lines 525/frame frequency 30 Hz) same as the presently used system. The other operations of the circuit are the same as described with the section (1 - d), so the description thereof is omitted.

As described above, this circuit arrangement allows a MUSE signal to be displayed on a display having an aspect ratio 3:4 by using a signal for (scan lines 525/frame frequency 60 Hz). Furthermore, a signal downconverted from a MUSE signal is subjected to the IDTV process so that a poor S/N ratio usually caused by the down conversion can be alleviated.

(3) 3:4 Display (525/60, 1125/30)

Next, there will be described the case of a multi-scan display where an image is displayed on the display having an aspect ratio (3:4) which is non-interlace-scanned with scan lines 525 and frame frequency 60 Hz or interlace scanned with scan lines 1125 and frame frequency 30 Hz. This embodiment is shown in block form in FIG. 11.

(3 - a) Input of Presently Used NTSC System Signal

The same operations as described with the section (2 - a) are performed, so the description thereof is omitted.

(3 - b) Input of EDTV-II Signal

The same operations as described with the section (2 - b) are performed, so the description thereof is omitted.

(3 - c) Input of MUSE Signal

Figure 11:
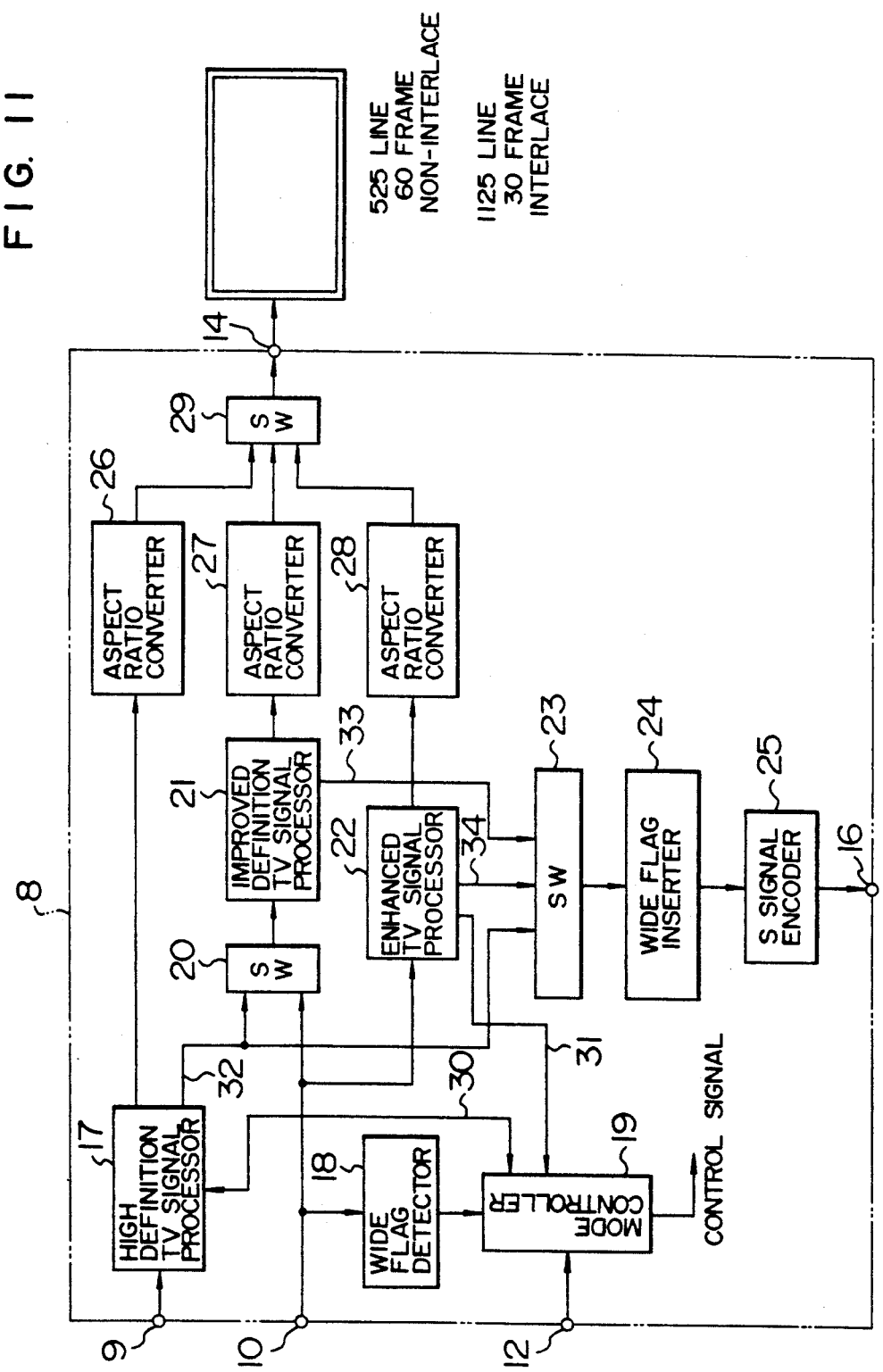
FIG. 11 is a block diagram showing another modification of the embodiment shown in FIG. 1.

Referring to FIG. 11, the HD processor 17 receives a MUSE signal and supplies a signal subjected to the decode process to the first aspect ratio converter 26. This signal is a high vision signal for (scan lines 1125/frame frequency 30 Hz) and is capable of displaying a very fine image.

For a signal to be supplied to the S signal output terminal, it is necessary to down convert into a signal for (scan lines 525/frame frequency 30 Hz). Examples of the structure of the HD processor 17 are shown in FIGS. 12A, 12B, and 12C.

In FIGS. 12A to 12C, reference numeral 71 represents an input signal from the video input terminal 9, 72 a MUSE Decoder, 73 an output signal to the first aspect ratio converter, 74 a down converter, 75 a decoder/converter, and 32 an output signal to the third switch 23.

In the circuit arrangement shown in FIG. 12A, the MUSE decoder 72 and the down converter 74 are connected in parallel so that a MUSE signal can be directly down converted with a simple and easy structure.

In the circuit arrangement shown in FIG. 12B, a high vision signal obtained by decoding a MUSE signal is down converted. When a motion adaptive process is executed by the MUSE decoder 72, a very fine signal for (scan lines 525/frame frequency 30 Hz) can be obtained.

In the circuit arrangement shown in FIG. 12C, by modifying the read/write process of the frame memory and the interpolation filter process, the MUSE decoder and the down converter are realized by a same circuitry.

In the embodiment shown in FIG. 11, the decoder/converter 75 of the HD processor 17 shown in FIG. 12C operates as a decoder. The down converter 74 again down converts an output from the decoder/converter 76. This down conversion is for the S signal output so that a narrower bandwidth and more simple process may be used, than that for the conversion for the display output. In addition, the decoder/converter 75 also can take a partial role of a memory and filter, so that the scale of the down converter can be reduced correspondingly.

Figure 13:
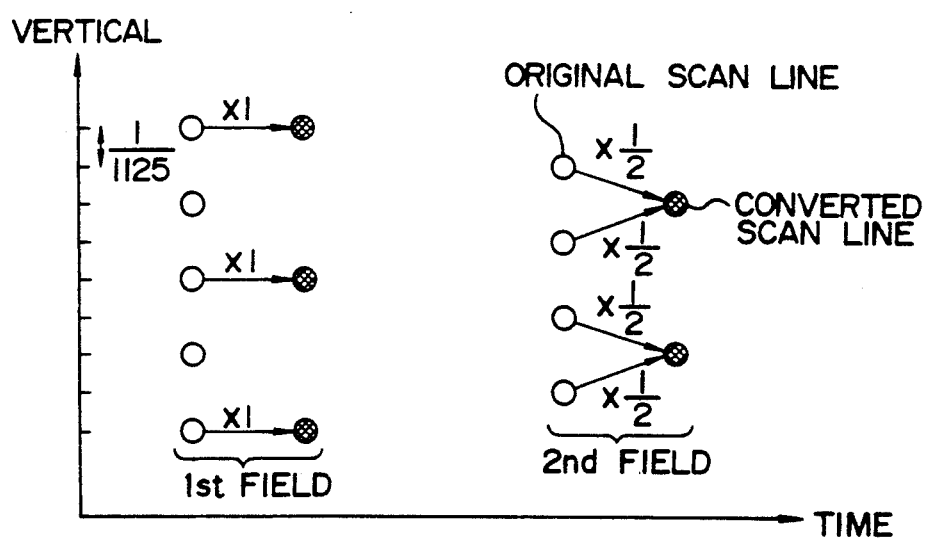
FIG. 13 illustrates the down converting process.

In both the conversion processes, a signal for (scan lines 1125/frame frequency 30 Hz) is converted into a signal for (scan lines 525/frame frequency 30 Hz). Thus, a new scan line of the (scan lines 525/frame frequency 30 Hz) system is derived from two scan lines of the (scan lines 1125/frame frequency 30 Hz) system, with the time shift being compensated during the vertical blanking period. Refer to an example of such conversion shown in FIG. 13.

(3 - d) Signal to Other Video Apparatus

The operations are the same as described with the section (2 - d), so the description thereof is omitted.

As described above, with the above arrnagement, a MUSE signal or EDTV-II signal can be displayed on a display having the aspect ratio 3:4. Furthermore, since a MUSE signal can be displayed as a signal for (scan lines 1125/frame frequency 30 Hz), it is possible to obtain a very fine image having a larger number of scan lines.

(4) 9:16 Display (525/30)

Next, there will be described the case where an image is displayed on a display having a wide aspect ratio (9:16) which is interlace-scanned with scan lines 525 and frame frequency 30 Hz. This embodiment is shown in block form in FIG. 14.

(4 - a) Input of Presently Used NTSC System Signal

Figure 14:
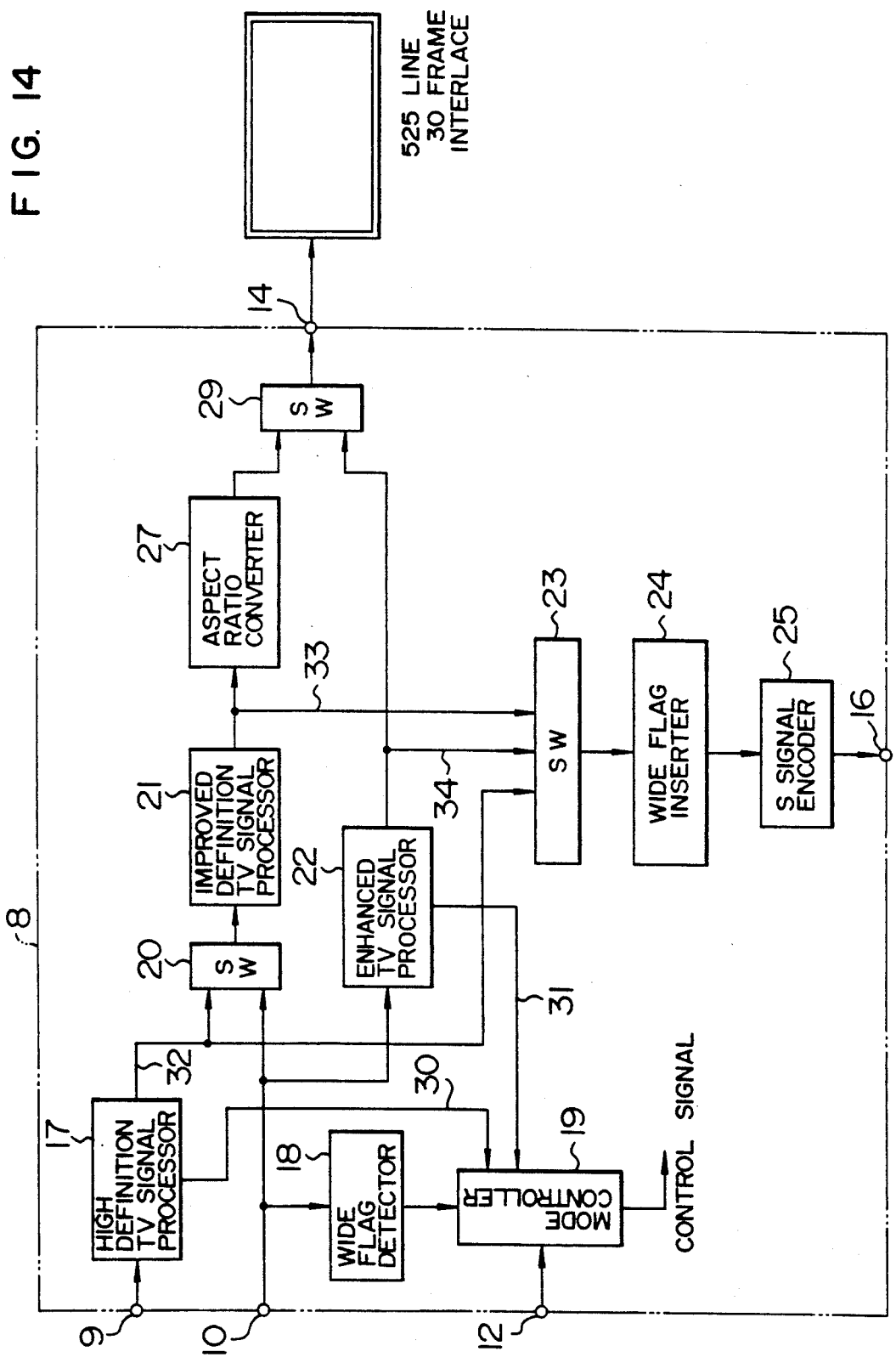
FIG. 14 is a block diagram showing a still further modification of the embodiment shown in FIG. 1.

Referring to FIG. 14, the ID processor 21 performs the IDTV process at the standard speed, and thereafter outputs the signal to the display terminal 14 via the second aspect ratio converter 27.

The second aspect ratio converter 27 converts the television signal inputted from the video input terminal 10, if it is not the wide aspect signal, so as to make it have a normal vertical/horizontal ratio image on the display having the wide aspect ratio. As this conversion method, it can be considered to use a method of vertically expanding an image, or a method of horizontally (or laterally) compressing an image. Such a method is selected by the mode select signal 12. If the television signal inputted from the video input terminal 10 is the wide aspect signal, the second aspect ratio converter 27 is controlled to stop operating. Whether the input signal is the wide aspect signal or not is detected by the wide flag detector 18.

The conversion of the aspect ratio can be realized in the following manner by using the structure shown in FIG. 3.

First, the horizontal (lateral) compression method will be described. For example, in order to avoid the standard aspect image shown in FIG. 15A to be displayed on the display having the wide aspect ratio such as an image which is horizontally or expanded as shown in FIG. 15B, the video signal to be displayed is compressed by ¾-fold in the direction with respect to time. In this case, the read speed to the memory is made about 4/3 times as fast as the write speed, so that the image of the standard aspect ratio can be displayed on the area about ¾ of the display having the wide aspect ratio.

Figure 17:
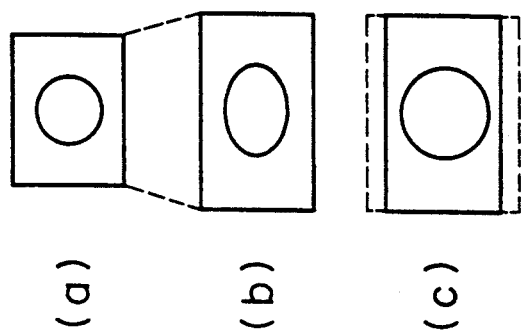
FIG. 17 illustrates inconveniences suffered when aspect ratio conversion is not applied.

Next, the up and down expansion method will be described. In this case, the image is vertically expanded by about 4/3-fold to have a normal vertical/horizontal ratio as shown in FIG. 17C. To this end, for example, four scan lines are formed from three original scan lines by a filtering process, and the converted scan lines are displayed.

Figure 18:
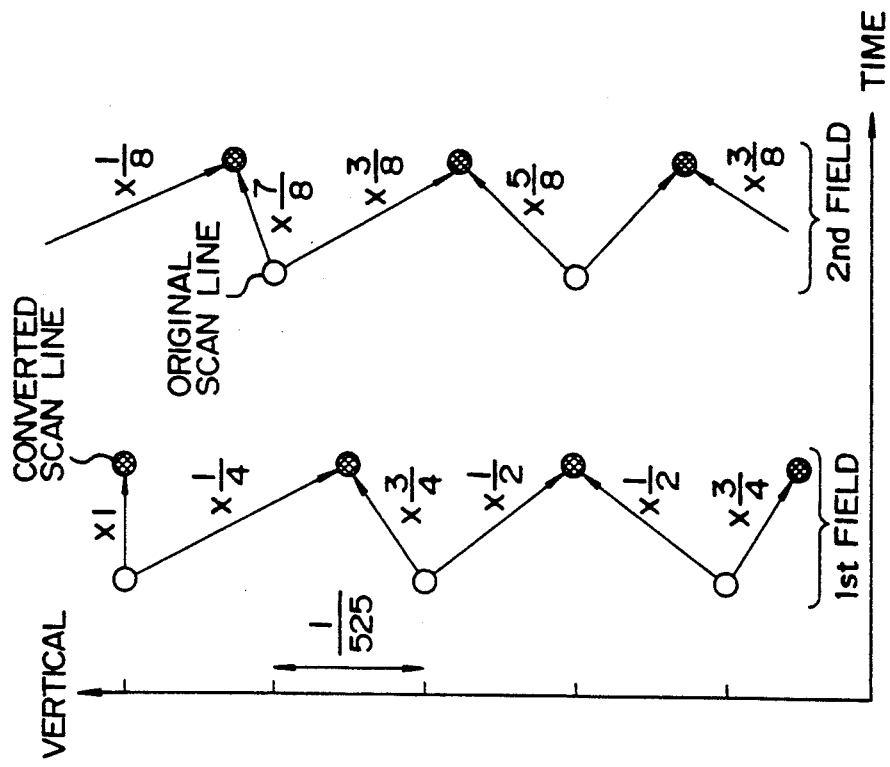
FIG. 18 illustrates the scan line arrangement when aspect ratio conversion is applied.

In FIG. 18, a circle represents an original scan line, a solid circle represents a converted scan line, and a combination of an arrow and associated numerical value represents a mixture ratio at which converted scan lines are formed from original scan lines.

It becomes possible to obtain an image shown in FIG. 17C by writing converted scan lines shown in FIG. 18 in the buffer memory 43 and sequentially reading the ⅔ portion in the vertical direction.

(4 - b) Input of EDTV-II Signal

The operations of this section (4 - b) are substantially the same as described with the section (1 - b). However, since the display having a wide aspect ratio is used, the third aspect ratio converter 28 shown in FIG. 2 is controlled to stop its operation.

(4 - c) Input of MUSE Signal

The operations of this section (4 - c) are substantially the same as described with the section (1 - c). However, since the display having a wide aspect ratio is used, the second aspect ratio converter 27 shown in FIG. 2 is controlled to stop its operation.

(4 - d) Signal to Other Video Apparatus

The operations of this section (4 - d) are the same as described with the section (1 - d), so the description thereof is omitted.

As described above, with the above arrangement, an NTSC signal for a standard aspect ratio can be displayed on a display having a wide aspect ratio 9:16 with scan lines 525 and frame frequency 30 Hz. Furthermore, the signal obtained from a MUSE signal through down conversion is also subjected to the IDTV process at the standard speed so that a low S/N ratio usually caused by a down converter can be alleviated.

(5) 9:16 Display (525/60)

Next, there will be described the case where an image is displayed on a display having a wide aspect ratio (9:16) which is non-interlace-scanned with scan lines 525 and frame frequency 60 Hz. This embodiment is shown in block form in FIG. 19.

(5 - a) Input of Presently used NTSC System Signal

Figure 19:
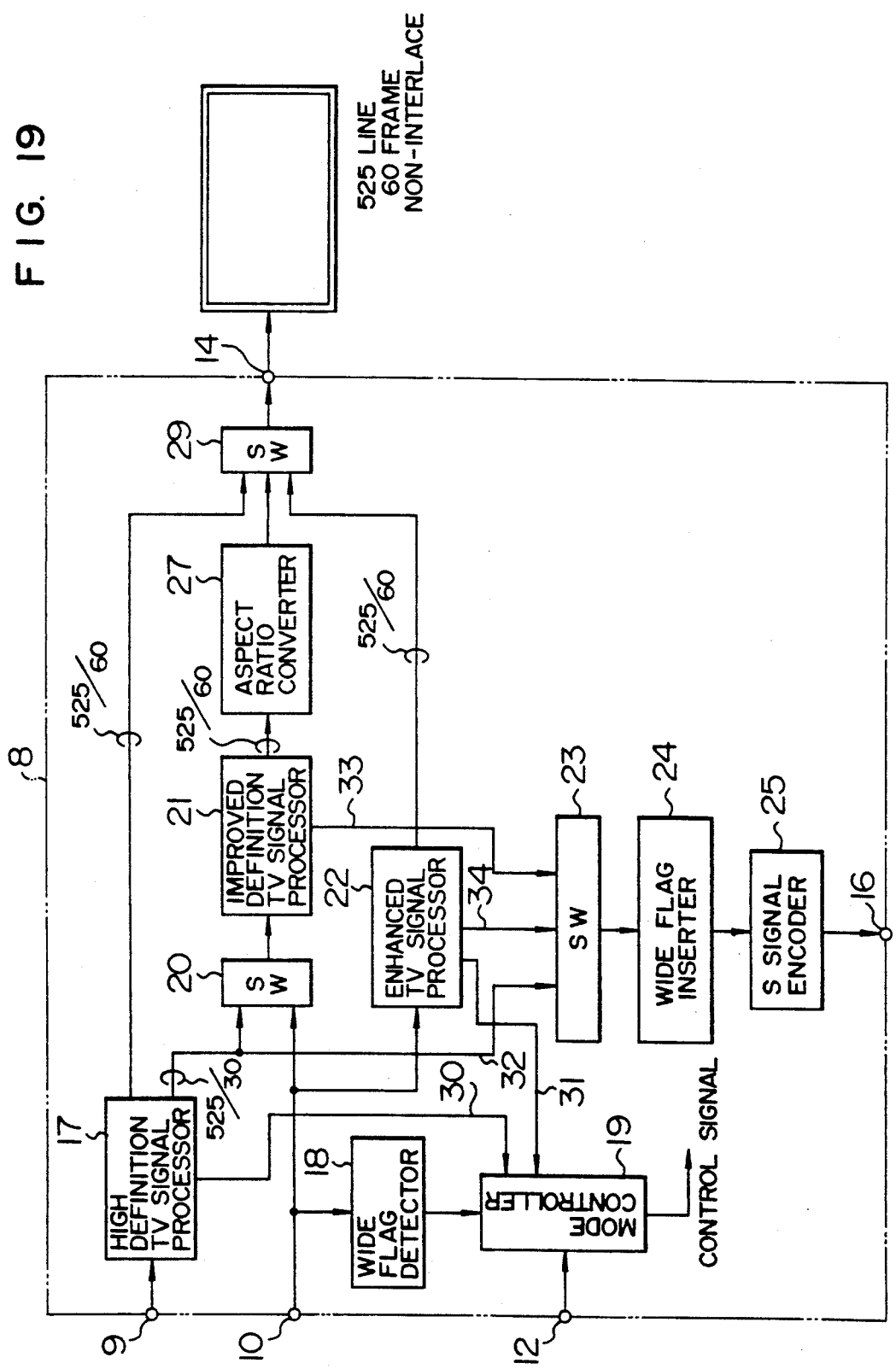
FIGS. 19 and 20 are block diagrams showing still further modifications of the embodiment shown in FIG. 1.

The operations of this section (5 - a) are substantially the same as that described in the section (4 - a) except that the ID processor 21 shown in FIG. 19 performs the IDTV process with sequential scan conversion.

The ID processor 21 supplies a non-interlace-scanned signal obtained through sequential scan conversion to the display terminal 14 via the second aspect ratio converter 27, and also supplies a signal 33 subjected only to the IDTV process at the standard speed to the S output terminal 16 via the third switch 23.

It is therefore possible to display a high quality image on a non-interlace display without line flickers. Furthermore, a signal having the scan format same as the presently used system can be outputted to the S output terminal 16 thereby allowing a connection to a presently available VCR.

(5 - b) Input of EDTV-II Signal

The operations of this section (5 - b) when an EDTV-II signal is inputted are substantially the same as that described in the section (4 - b) except that the ED processor 22 shown in FIG. 19 performs the EDTV process with sequential scan conversion.

The ED processor 22 supplies a non-interlace-scanned signal obtained through sequential scan conversion to the display terminal 14, and also supplies a signal 34 subjected only to the EDTV process at the standard speed to the S output terminal 16 via the third switch 23. It is therefore possible to display a high quality image on a non-interlace display without line flickers. Furthermore, a signal having the scan format same as the presently used system can be outputted to the S output terminal 16 thereby allowing a connection to a presently available VCR.

(5 - c) Input of MUSE Signal

The operations of this section (5 - c) are the same as the case where the operations of the first aspect ratio converter 26 and the second aspect ratio converter 27 are stopped in the description of the section (2 - c).

(5 - d) Signal to Other Video Apparatus

The process of this section (5 - c) is the same as described with the section (2 - d), so the description thereof is omitted.

As described above, with this circuit arrangement, an NTSC signal for a standard aspect ratio can be displayed on a display having a wide aspect ratio 9:16 by using a signal for (scan lines 525/frame frequency 60 Hz). Furthermore, a signal down-converted from a MUSE signal is subjected to the IDTV process so that a poor S/N ratio usually caused by the down conversion can be alleviated.

(6) 9:16 Display (525/60, 1125/30)

Figure 20:
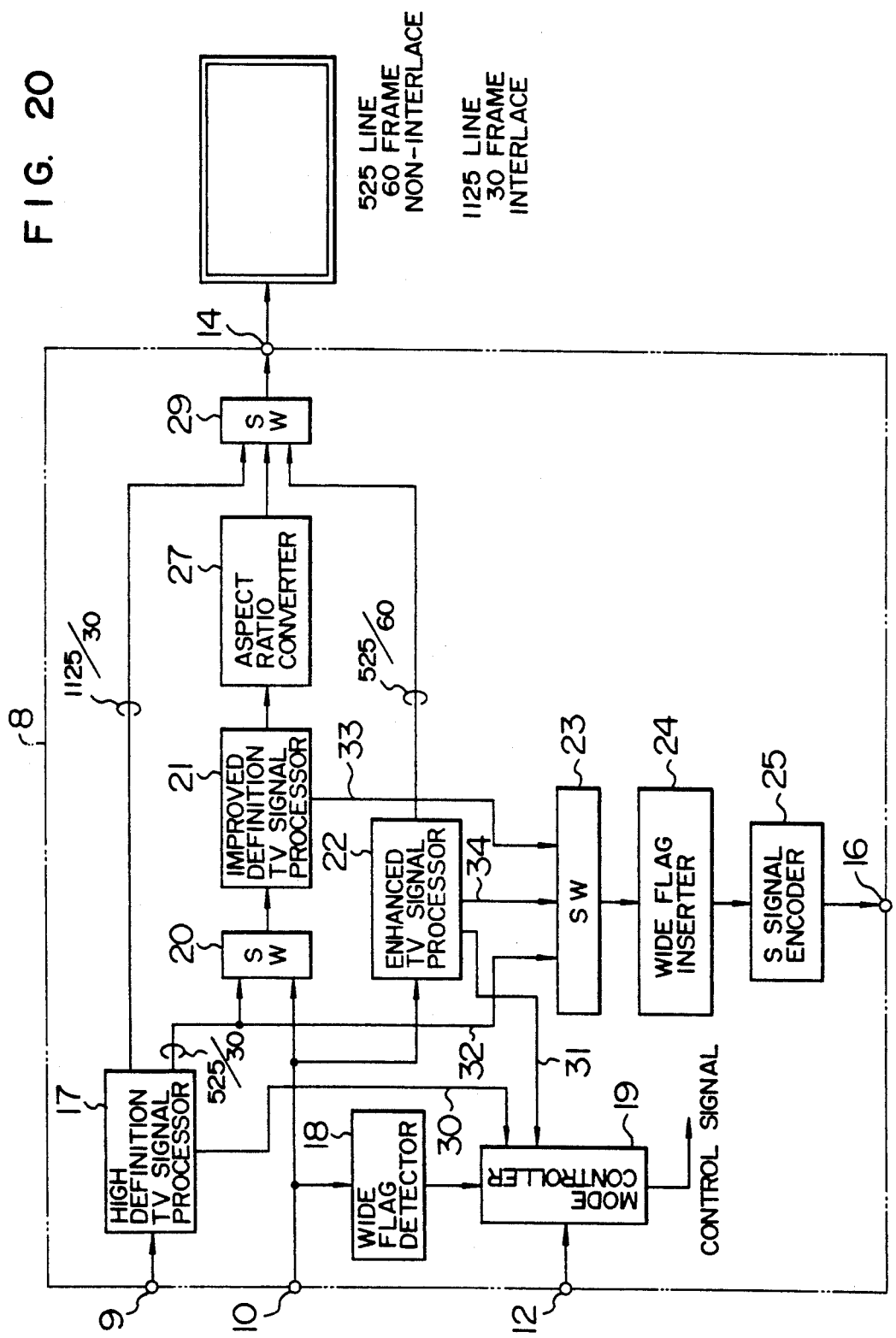

Next, there will be described the case of a multi-scan display where an image is displayed on the display having an aspect ratio (9:16) which is non-interlace-scanned with scan lines 525 and frame frequency 60 Hz or interlace scanned with scan lines 1125 and frame frequency 30 Hz. This embodiment is shown in block form in FIG. 20.

(6 - a) Input of Presently used NTSC System Signal

The same operations as described with the section (5 - a) are performed, so the description thereof is omitted.

(6 - b) Input of EDTV-II Signal

The same operations as described with the section (5 - b) are performed, so the description thereof is omitted.

(6 - c) Input of MUSE Signal

The operations of this section (6 - c) are the same as the case where the operation of the first aspect ratio converter 26 is stopped in the description of the section (3 - c).

(6 - d) Signal to Other Video Apparatus

The operations are the same as described with the section (2 - d), so the description thereof is omitted.

As described above, with the above arrangement, an NTSC signal for a standard aspect ratio can be displayed on a display having a wide aspect ratio 9:16. Furthermore, since a MUSE signal can be displayed as a signal for (scan lines 1125/frame frequency 30 Hz), it is possible to obtain a very fine image having a larger number of scan lines.

Figure 21:
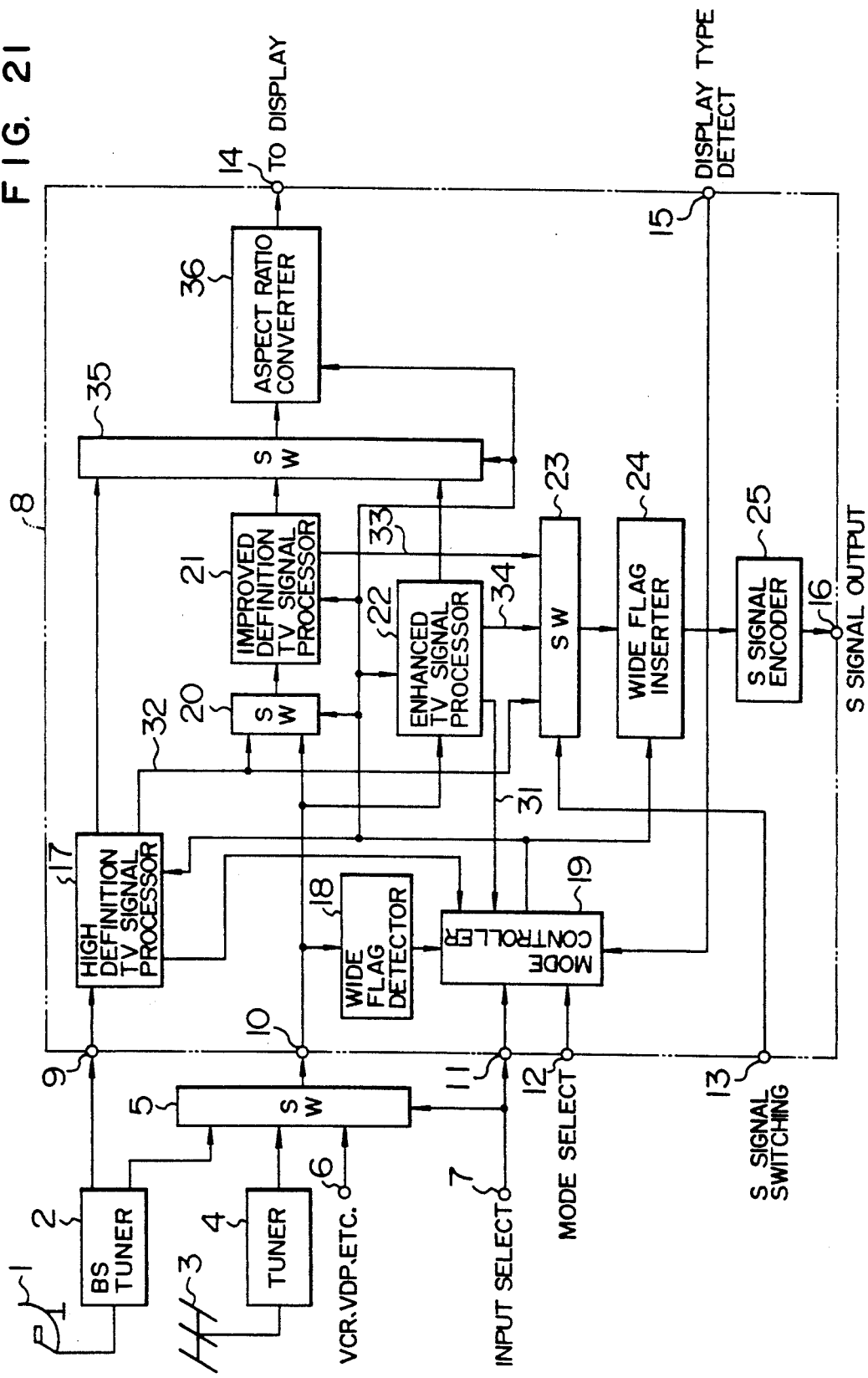
FIGS. 21 and 22 are block diagrams showing other embodiments of the present invention.

Another embodiment of this invention is shown in block form in FIG. 21. In this figure, reference numeral 35 represents a fifth switch, and 36 a fourth aspect ratio converter. Other circuit elements are the same as FIG. 1.

In the embodiments described previously, the outputs from the HD processor 17, ID processor 21, and ED processor 22 are supplied respectively to the aspect ratio converters 26, 27, and 28 and selected by the fourth switch 29. The invention is not limited to such circuit arrangement.

In the embodiment shown in FIG. 21, one of the outputs is selected by the fifth switch 35 and thereafter supplied to the fourth aspect ratio converter 36. With this arrnagement, the number of aspect ratio converters and hence the circuit scale can be reduced. In this case also, there is no problem because the first to third aspect ratio converters 26, 27, and 28 of the embodiment shown in FIG. 1 are not necessary to operate concurrently.

Figure 22:
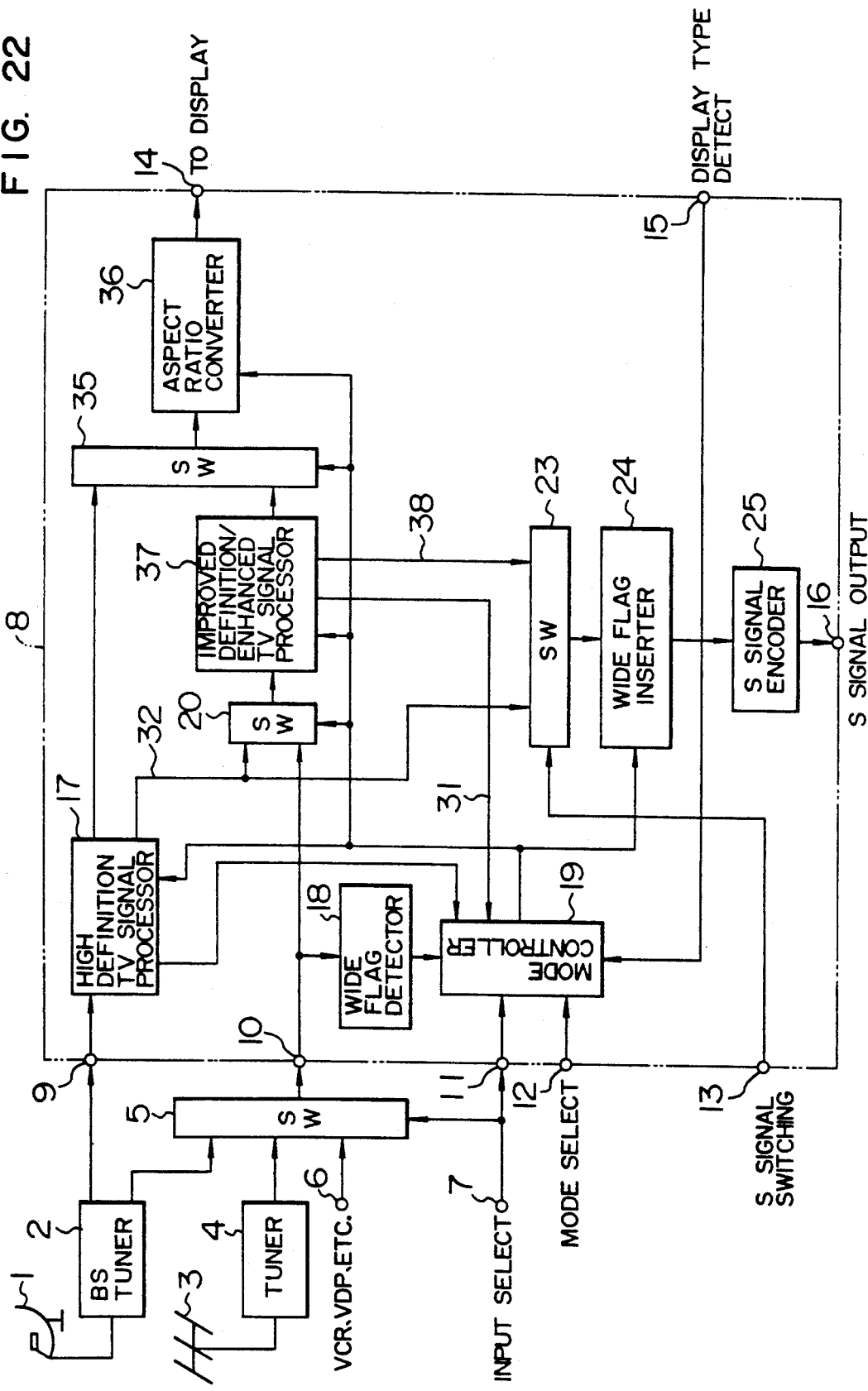

A still further embodiment of this invention is shown in block form in FIG. 22. In this figure, reference numeral 37 represents an ID/ED processor, and 38 a signal for an S signal output having the scan format in conformity with the presently used standard television signal.

As apparent from FIGS. 9 and 10 described previously, the ED processor 22 can be realized by adding the wide information decoder 63 and the ED flag detector 66 to the ID processor 21. Therefore, by switching these circuits, the ID processor 21 and the ED processor 22 can be integrally formed. This embodiment reduces the circuit scale by integrating the ID processor 21 and the ED processor 22.

As described so far, the present invention provides a television signal processing circuit allowing a single television signal receiver to receive any one of a high definition television signal, an EDTV signal, and a presently used standard television signal.

Furthermore, the present invention provides a television signal processing circuit capable of being commonly used for both a standard aspect ratio (3:4) and a wide aspect ratio of a display and for any type of the scan scheme of a display. This is particularly effective if the circuit is implemented as an integrated circuit.

As above, the present invention realizes a television signal processing circuit capable of reducing a manufacturing cost and a design work.

Furthermore, irrespective of the type of a display, since the HD processor outputs a signal in conformity with the presently used television signal scan format, it is possible to output signals for the image recording by presently available peripheral apparatus such as VCRs.

Still further, according to the present invention, even if an inputted television signal has a scan format in conformity with the presently used standard television signal, the aspect ratio can be correctly recognized thereby allowing to display a normal vertical/horizontal ratio image.

Further, an ED processor may be constructed by integrally adding together a wide information decoder and an Ed flag detector, thereby reducing the circuit scale.

Furthermore, an ED processor may be constructed such that it performs a motion adaptive high image quality process using the inter-frame correlation, and then a wide information insertion process, and lastly a motion adaptive high image quality process using the inter-field correlation. It is therefore possible to easily obtain both signals subjected and not subjected to the motion adaptive high image quality process using inter-field correlation.

What is claimed is:

1. A television for receiving two or more types of television signals, the television having a television signal processing circuit, said television signal processing circuit comprising:

input selecting means for designating a television signal to be inputted;

a television signal input terminal for receiving the designated television signal;

a display terminal adapted to be connected to a display on which the television signal is displayed as an image;

a display type input terminal for receiving a signal representative of a connected display;

at least two types of processors for demodulating a signal inputted rom said television signal input terminal into a television signal for the display;

aspect ratio conversion means for receiving a video output signal from said processor, converting said received video signal into a signal corresponding to an aspect ratio of the display connected to said display terminal, and outputting said converted signal to said connected display;

signal discriminating means for receiving said designated television signal and discriminating type of said designated television signal; and mode control means for receiving a discrimination signal from said signal discriminating means, a display type discrimination signal from said display type input terminal, and the designation signal from said input selecting means, designating an operation mode in accordance with the inputted signals, and causing said processors and said aspect ratio conversion means to operate in a predetermined manner.

2. A television according to claim 1, wherein at least one of said processors comprises decode means for demodulating an inputted high definition television signal into a high definition television signal for the display, and down-convert means for down converting said inputted high definition television signal into a standard television signal for the display.

3. A television according to claim 2, wherein an output signal from said down-convert means of said processor is supplied to a processor different from said processor to be subjected to an IDTV process to improve an S/N ratio, and thereafter outputted to said display terminal via said aspect ratio conversion means.

4. A television according to claim 3, further comprising encode means for receiving a standard television signal for the display outputted from said processors and converting said standard television signal into a television signal including a separated luminance signal and color signals for the image recording by a video apparatus.

5. A television according to claim 4, further comprising the wide screen discrimination signal adding means for adding a wide screen discrimination signal to a signal outputted from said encode means if said output signal is for the side aspect ratio, and wide screen discrimination detection means for detecting, if a television signal inputted from said television signal input terminal is added with said wide screen discrimination signal, said wide screen discrimination signal, and informing said mode control means of the detection.

6. A television according to claim 2, further comprising encode means for receiving a standard television signal for the display outputted from said processors and converting said standard television signal into a television signal including a separated luminance signal and color signals for the image recording by a video apparatus.

7. A television according to claim 6, further comprising wide screen discrimination signal adding means for adding a wide screen discrimination signal to a signal outputted from said encode means if said output signal is for a wide aspect ratio, and wide screen discrimination detection means for detecting, if a television signal inputted from said television signal input terminal is added with said wide screen discrimination signal, said wide screen discrimination signal, and informing said mode control means of the detection.

8. A television according to claim 1, wherein at least one of said processors comprises down-convert means for down converting an inputted high definition television signal into a standard television signal for the display.

9. A television according to claim 8, wherein an output signal from said down-convert means of said processor is supplied to a processor different from said processor to be subjected to an IDTV process to improve an S/N ratio, and thereafter outputted to said display terminal via said aspect ratio conversion means.

10. A television according to claim 9, further comprising encode means for receiving a standard television signal for the display outputted from said processors and converting said standard television signal into a television signal including a separated luminance signal and color signals for the image recording by a video apparatus.

11. A television according to claim 10, further comprising wide screen discrimination signal adding means for adding a wide screen discrimination signal to a signal outputted from said encode means if said output signal is for a wide aspect ratio, and wide screen discrimination detection means for detecting, if a television signal inputted from said television signal input terminal is added with said wide screen discrimination signal, said wide screen discrimination signal, and informing said mode control means of the detection.

12. A television according to claim 8, further comprising encode means for receiving a standard television signal for the display outputted from said processors and converting said standard television signal into a television signal including a separated luminance signal and color signals for the image recording by a video apparatus.

13. A television according to claim 12, further comprising a wide screen discrimination signal adding means for adding a wide screen discrimination signal to a signal outputted from said encode means if said output signal is for a wide aspect ratio, and wide screen discrimination detection means for detecting, if a television signal inputted from said television signal input terminal is added with said wide screen discrimination signal, said wide screen discrimination signal, and informing said mode control means of the detection.

14. A television according to claim 1, further comprising encode means for receiving a standard television signal for the display outputted from said processors and converting said standard television signal into a television signal including a separated luminance signal and color signals for the image recording by a video apparatus.

15. A television according to claim 14, further comprising wide screen discrimination signal adding means for adding a wide screen discrimination signal to a signal outputted from said encode means if said output signal is for a wide aspect ratio, and wide screen discrimination detection means for detecting, if a television signal inputted from said television signal input terminal is added with said wide screen discrimination signal, said wide screen discrimination signal, and informing said mode control means of the detection.

16. A television according to claim 1, wherein at least one of said processors is an ED processor for performing an EDTV process of an EDTV signal which is one of the received television signals.

17. A television according to claim 1, wherein said at least two or more types of said processors comprise an ED processor and an ID processor, and motion adaptive high image quality means of said ED processor for performing a motion adaptive high image quality process using inter-frame or inter-field correlation is used in common with motion adaptive high image quality means of said ID processor.

* * * * *

UNITED STATES PATENT AND TRADEMARK OFFICE
CERTIFICATE OF CORRECTION

PATENT NO. : 5,218,436

DATED : June 8, 1993

INVENTOR(S) : Masato Sugiyama, et al.

It is certified that error appears in the above-identified patent and that said Letters Patent is hereby corrected as shown below:

Claim 1, column 16, line 11, delete "rom" and substitute therefor --from--.

Claim 1, column 16, line 20, after "discriminating" insert --the--.

Signed and Sealed this

Eighteenth Day of January, 1994

Attest:

BRUCE LEHMAN

*Attesting Officer*  *Commissioner of Patents and Trademarks*